Aug. 1, 1944.  R. B. LUCKENBACH  2,354,761
TURBINE APPARATUS
Filed March 8, 1943  2 Sheets-Sheet 1

WITNESSES:

INVENTOR
RICHARD B. LUCKENBACH
BY
ATTORNEY

Aug. 1, 1944.  R. B. LUCKENBACH  2,354,761
TURBINE APPARATUS
Filed March 8, 1943  2 Sheets-Sheet 2

INVENTOR
RICHARD B. LUCKENBACH
BY
ATTORNEY

Patented Aug. 1, 1944

2,354,761

UNITED STATES PATENT OFFICE 2,354,761

TURBINE APPARATUS

Richard B. Luckenbach, Secane, Pa., assignor to Westinghouse Electric & Manufacturing Company, East Pittsburgh, Pa., a corporation of Pennsylvania Application March 8, 1943, Serial No. 478,460

12 Claims. (Cl. 60—1)

This invention relates to elastic-fluid turbines, more particularly to lagging therefor, and has for an object to provide an improved lagging arrangement.

Another object of the invention is to provide means associated with the turbine lagging for eliminating fire hazards.

A further object of the invention is to provide lagging for a turbine, its valve chest and governing mechanism, together with means for protecting the governing mechanism from heat from the turbine and valve chest.

Yet another object of the invention is to provide lagging for a turbine and its bearing, together with means to protect the latter from the heat from the former.

Another object of the invention is to provide means for removing heated air from the space enclosed by the turbine lagging.

These and other objects are effected by the invention as will be apparent from the following description and claims taken in connection with the accompanying drawings, forming a part of this application, in which:

With present-day turbine installations, operating temperatures ranging from 600° F. to 1200° F. are usual. Obviously, with such temperatures, there is always present the hazard of fire. One of the main sources of fires in such apparatus is oil leaking from the lubricating system and contacting highly heated parts of the apparatus. Where oil governors are used there is presented another source of oil leakage.

Inasmuch as it is difficult, if not impossible, to positively prevent such leakage of oil, it becomes essential to eliminate or guard against the other part of the fire hazard, that is, the presence of highly heated pieces of apparatus with which the leaking oil may contact.

To this end, the present invention provides means forming a barrier within the space enclosed by the lagging of a turbine unit and serving to prevent flow of heat from the turbine and its valve chest to parts of the installation which might be contacted by leaking oil, such as the bearing and its pedestal and the governor, these parts being located adjacent the high-temperature end of the turbine.

Figure 1:
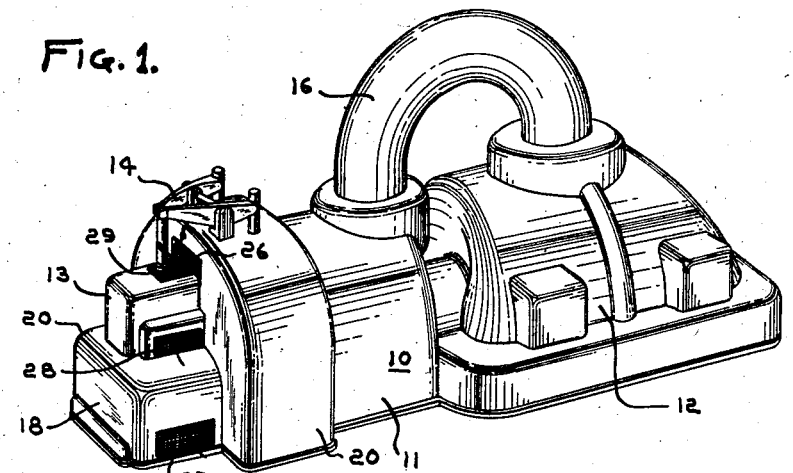
Fig. 1 is a perspective view of apparatus embodying the invention.
Figure 2:
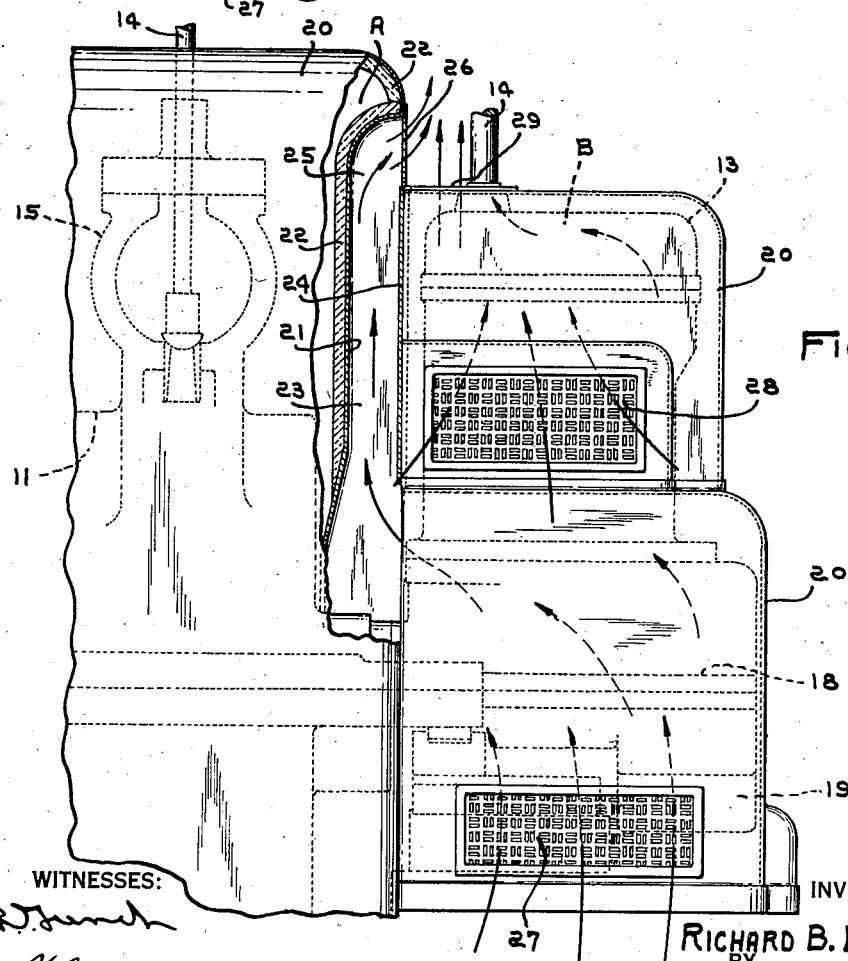
Fig. 2 is a side elevational view of a lagged turbine with a portion of the lagging broken away for the sake of clearness.
Figure 3:
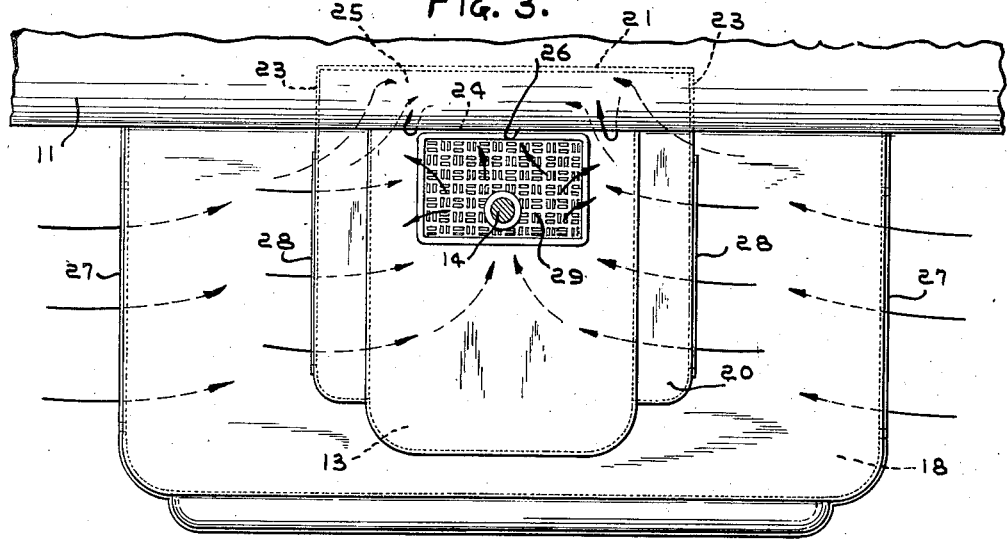
Fig. 3 is a plan view of the structure shown in Fig. 2.
Figure 4:
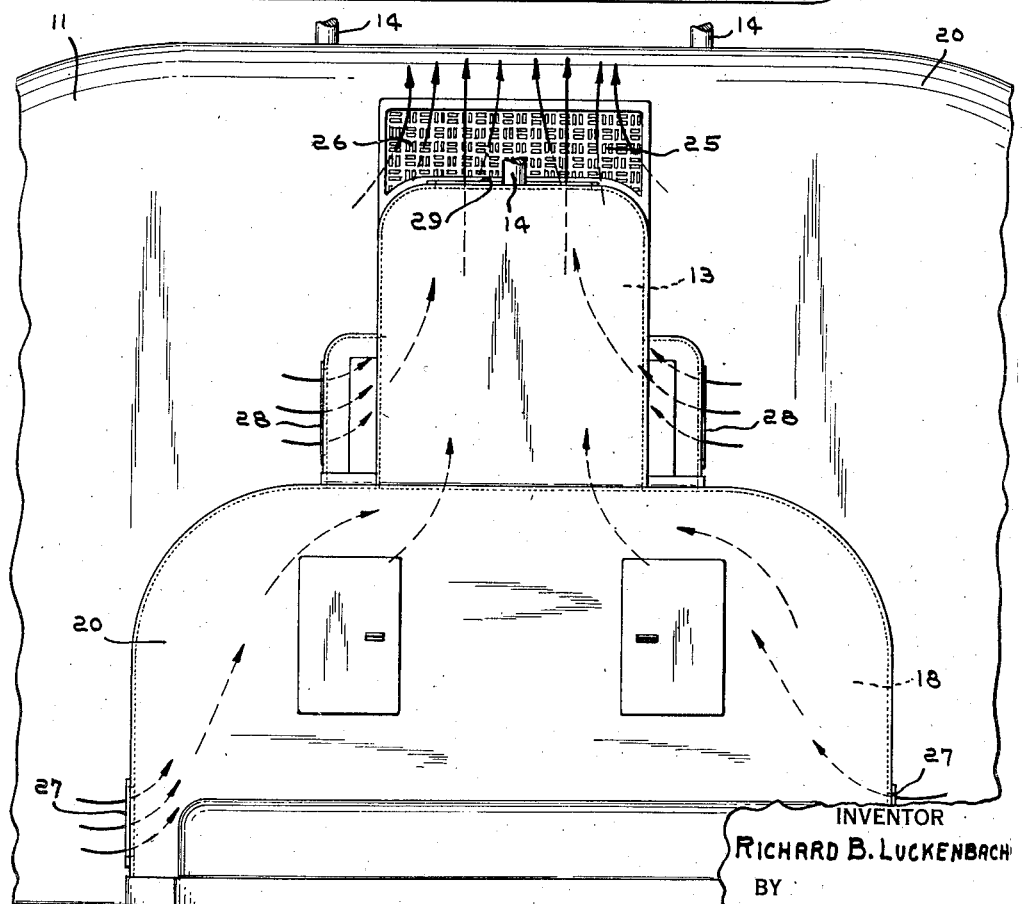
Fig. 4 is an end elevational view of the structure illustrated in Figs. 2 and 3.

Referring now to the drawings more in detail, there is shown, at 10, a turbine unit comprising a high-pressure turbine 11 and a low-pressure turbine 12. The governor 13 preferably is of the oil type, but inasmuch as its detailed construction forms no part of the present invention, further description is omitted. This type of governor is fully described in the U. S. patent of A. F. Schwendner 2,224,321, for Hydraulic governing apparatus, granted to applicant's assignee on December 10, 1940. The governor, operating through the linkage 14, controls admission of high-temperature motive fluid to the valve chest 15 (Fig. 2). Exhaust motive fluid from the high-pressure turbine 11 is conducted to the low-pressure turbine 12 by the cross-over connection 16.

The turbine rotor is provided with the usual bearing 18 supported by the bearing pedestal 19, the bearing being supplied with lubricating oil by conventional means, not shown.

A transversely-extending partition 21 covered with insulating material 22 serves to divide the space enclosed by the lagging 20 into a first enclosure A surrounding the heat-producing parts of the installation, that is, the turbine 11 and its valve chest 15, and a second space B about the parts of the installation which are subject to contact by leaking oil, these parts being the governor 13, the bearing 18, and its pedestal 19.

Cooperating with the transverse partition 21 are vertical side walls 23 and end walls 24 providing, in effect, a vertical air duct or chimney 25, terminating at its upper end in a grilled air outlet 26. Grilled inlets 27 for cool air are provided in the sides of the lagging adjacent the pedestal 19, the air entering therethrough passing in cooling relation to the pedestal and bearing and then, as it becomes heated, rising by natural draft through the chimney or air duct 25 and discharging through the air outlet 26 at the top of the latter. It will be apparent that this arrangement provides a vertically-moving curtain of air between the spaces A and B, serving to pick up and carry away heat which may pass the insulated partition 21, 22.

Additional cool air inlets 28 are provided in the sides of the lagging of space B, and are so positioned that the cool air entering therethrough passes in cooling relation with respect to the governor 13 before discharging through the grilled outlet 29.

It will be obvious that the natural draft may be supplemented by forced or induced draft, if desired.

From the foregoing it will be apparent that not only is the hazard of fire in such an installation materially reduced, if not completely eliminated, but also the bearing and governor are air cooled to such an extent as to materially relieve the load which would otherwise be imposed upon the oil coolers.

While the invention has been shown in but one form, it will be obvious to those skilled in the art that it is not so limited, but is susceptible of various changes and modifications without departing from the spirit thereof, and it is desired, therefore, that only such limitations shall be placed thereupon as are specifically set forth in the appended claims.

What is claimed is:

1. The combination with an elastic fluid turbine having lubricant-utilizing apparatus adjacent one end thereof, of means for minimizing the fire hazard due to escaping lubricant contacting highly heated parts; said means comprising structure providing an upright duct which encloses the lubricant-utilizing apparatus and has at least a portion disposed between said turbine and the lubricant-utilizing apparatus, said structure being formed to provide an air inlet opening at or near the base of the apparatus and an outlet opening arranged above the apparatus in order that the duct may function to provide a natural draft of air which is effective to cool parts exposed thereto below the ignition temperature of escaping lubricant.

2. The combination with an elastic fluid turbine having lubricant-utilizing apparatus adjacent one end thereof, of means for minimizing the fire hazard due to escaping lubricant contacting highly heated parts; said means comprising structure enclosing the turbine and the lubricant-utilizing apparatus and providing therebetween an insulating barrier against flow of heat from the former to the latter; and means for collecting and removing from the enclosed space about the lubricant-utilizing apparatus any heat passing the barrier.

3. Structure as specified in claim 2, wherein the structure enclosing the turbine and lubricant-utilizing apparatus is formed to provide an air inlet opening at or near the base of said apparatus and an outlet opening above the apparatus in order to provide a natural draft of air which is effective to cool parts exposed thereto below the ignition temperature of escaping lubricant.

4. The combination with an elastic fluid turbine having lubricant-utilizing apparatus adjacent one end thereof, of means for minimizing the fire hazard due to escaping lubricant contacting highly heated parts; said means comprising lagging enclosing the turbine and the lubricant-utilizing apparatus, said lagging being formed to provide a lower air inlet opening to and an upper air outlet opening from the space enclosed by said lagging, said openings being so disposed with respect to the turbine and the lubricant-utilizing apparatus as to provide therebetween a natural draft vertically-moving wall of air.

5. The combination with an elastic fluid turbine having lubricant-utilizing apparatus adjacent one end thereof, of means for minimizing the fire hazard due to escaping lubricant contacting highly heated parts; said means comprising lagging enclosing the turbine and lubricant-utilizing apparatus, a transversely-extending partition cooperating with the lagging to separate the space about the turbine from the space about the lubricant-utilizing apparatus, and means for removing from the latter space any heat passing the partition.

6. Structure as specified in claim 5, wherein the partition is insulated against passage therethrough of heat.

7. Structure as specified in claim 5, wherein the last-mentioned means comprises a lower cool air inlet and an upper warm air outlet through the lagging so disposed with respect to the partition that air entering the enclosed space about the lubricant-utilizing apparatus through said inlet and leaving the space through said outlet provides a vertically-moving curtain of air at the lubricant-utilizing apparatus side of the partition adapted to collect and carry away heat passing through said partition from the turbine.

8. Apparatus of the character described comprising an elastic-fluid turbine; a valve chest adjacent one end of the turbine; valve mechanism within the chest for controlling admission of high-temperature motive fluid to the turbine; a governor positioned in spaced relation to the turbine and valve chest and adapted to control action of the valve mechanism; lagging enclosing said turbine, chest and governor and having a lower cool air inlet and an upper warm air outlet so disposed that air entering the enclosed space through said inlet and leaving the space through said outlet provides a vertically-moving curtain of air separating the governor from the turbine and chest and adapted to collect and carry away heat from said turbine and chest before it can reach the governor.

9. Apparatus of the character described comprising an elastic-fluid turbine including a rotor and a casing therefor; a bearing support adjacent one end of the turbine; a bearing carried by the support and adapted to receive one end of the turbine rotor, said bearing being spaced from the turbine casing in a direction axially thereof; lagging enclosing said turbine and bearing and having a lower cool air inlet and an upper warm air outlet so disposed that air entering the enclosed space through said inlet and leaving the space through said outlet provides a vertically-moving curtain of air separating the bearing from the turbine and adapted to collect and carry away heat from the turbine before it can reach the bearing.

10. Apparatus of the character described comprising an elastic-fluid turbine including a rotor and a casing therefor; a valve chest adjacent one end of the turbine; valve mechanism within the chest for controlling admission of high-temperature motive fluid to the turbine; a bearing support adjacent said one end of the turbine; a bearing carried by said support and adapted to receive one end of the turbine rotor; a governor disposed above the bearing and adapted to control action of the valve mechanism, said bearing and governor being spaced from the turbine and valve chest in a direction axially of the turbine; lagging enclosing the turbine, chest, bearing and governor and having a lower cool air inlet and an upper warm air outlet so disposed that air entering the enclosed space through said inlet and leaving the space through said outlet provides a natural draft moving curtain of air in the space between the turbine and chest at one side and the bearing and governor at the other side, said curtain of air being adapted to collect and carry away heat from the turbine and chest before it can reach the bearing and governor.

11. Structure as specified in claim 10, including a heat-insulating partition separating the turbine and chest from the bearing and governor and, with the adjacent lagging, providing a chimney flow of the curtain of air past that surface of the partition adjacent the bearing and governor.

12. Structure as specified in claim 10, wherein the lagging is provided with first and second cool air inlets so disposed that cool air entering the first inlet flows in cooling relation to the bearing and cool air entering the second inlet flows in cooling relation to the governor.

RICHARD B. LUCKENBACH.